US012636819B2

(12) United States Patent
Baldisserri et al.

(10) Patent No.: US 12,636,819 B2
(45) Date of Patent: May 26, 2026

(54) MALE ELEMENT OF A MOULD

(71) Applicant: SACMI COOPERATIVA MECCANICI IMOLA SOCIETA' COOPERATIVA, Imola (IT)

(72) Inventors: Davide Baldisserri, Imola (IT); Stefano Bergami, Castel San Pietro Terme (IT); Marcello Zama, Faenza (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 240 days.

(21) Appl. No.: 18/252,166

(22) PCT Filed: Nov. 9, 2021

(86) PCT No.: PCT/IB2021/060359
§ 371 (c)(1),
(2) Date: May 8, 2023

(87) PCT Pub. No.: WO2022/101778
PCT Pub. Date: May 19, 2022

(65) Prior Publication Data
US 2024/0017450 A1 Jan. 18, 2024

(30) Foreign Application Priority Data
Nov. 10, 2020 (IT) ........................ 102020000026873

(51) Int. Cl.
*B29C 43/52* (2006.01)
*B29B 11/12* (2006.01)
(Continued)

(52) U.S. Cl.
CPC .............. *B29C 43/52* (2013.01); *B29B 11/12* (2013.01); *B29C 43/02* (2013.01); *B29C 43/36* (2013.01);
(Continued)

(58) Field of Classification Search
CPC .......................... B29B 11/12; B29L 2031/712
See application file for complete search history.

(56) References Cited

U.S. PATENT DOCUMENTS 4,087,227 A 5/1978 Uhlig
8,790,112 B2 7/2014 Albrecht
(Continued)

FOREIGN PATENT DOCUMENTS

CN 101443179 A 5/2009
CN 104093534 A 10/2014
(Continued)

OTHER PUBLICATIONS

Office Action and Search Report for Taiwanese Patent Application No. 110141703, mailed on Mar. 6, 2025, 18 Pages.
International Search Report and Written Opinion for PCT/IB2021/060359, mailed Jan. 27, 2022.

*Primary Examiner* — Christina A Johnson
*Assistant Examiner* — Xue H Liu
(74) *Attorney, Agent, or Firm* — United IP Counselors, LLC

(57) ABSTRACT

A male element (100) of a mould (10) for the compression moulding of a parison comprises a die (110) and a ducting system (117), located inside the die (110) to allow a cooling fluid to flow in the male element (100), wherein the die (110) comprises: a body (112); a liner (116) fitted round the body (112) and having an outside surface, acting in conjunction with a female element (200) of the mould (10) to delimit a forming cavity (20), and an inside surface in contact with the outside surface of the body (112), wherein the ducting
(Continued)

system (117) is formed between the body (112) and the liner (116).

20 Claims, 5 Drawing Sheets

(51) Int. Cl.
*B29C 43/02* (2006.01)
*B29C 43/36* (2006.01)
*B29C 49/02* (2006.01)
*B29L 31/00* (2006.01)

(52) U.S. Cl.
CPC ..... *B29C 49/0685* (2022.05); *B29L 2031/712* (2013.01)

(56) References Cited

U.S. PATENT DOCUMENTS

| | | | |
|---|---|---|---|
| 10,781,010 | B2 | 9/2020 | Fukushima et al. |
| 2004/0258791 | A1 | 12/2004 | Neter et al. |
| 2012/0100241 | A1 | 4/2012 | Parrinello et al. |
| 2015/0044323 | A1* | 2/2015 | Penazzi .................. B29C 33/02 |
| | | | 425/469 |

FOREIGN PATENT DOCUMENTS

| | | | |
|---|---|---|---|
| EP | 3666493 | A1 | 6/2020 |
| JP | 2011-230293 | A | 11/2011 |
| WO | 2007107822 | A2 | 9/2007 |
| WO | 2008110887 | A3 | 6/2009 |
| WO | 2013140351 | A1 | 9/2013 |

* cited by examiner

MALE ELEMENT OF A MOULD

TECHNICAL FIELD

This invention relates to a male element of a mould, a mould, a forming and blow moulding machine and a method for the compression moulding and blow moulding of a parison.

BACKGROUND ART

Known in the prior art are machines configured to form a parison by moulding and to blow mould the parison to obtain a container. More specifically, known from patent documents WO2008/110887A2 and WO2007107822A2, in the name of the present Applicant, is a machine which is configured to form the parison by compression moulding and to blow mould it; the machine comprises a plurality of moulds; each mould comprises a male element and a female element, configured to form the parison by compression moulding; after moulding, the female element is moved away from the male element and the parison remains hanging from the male element; next, the parison is stretched with a stretching rod, which is extractable from the male element, and then blow moulded into a blow moulding cavity to obtain the container.

Patent document U.S. Ser. No. 10/781,010B2 also discloses a machine which is configured to form a parison by compression moulding and to blow mould it. Patent document U.S. Pat. No. 8,790,112B2 discloses a machine which is configured to form a parison by injection moulding and to blow mould it.

In prior art forming and blow moulding machines, it is necessary to wait for the parison to cool before proceeding to blow moulding. Indeed, just after being formed by moulding, the parison is very hot and must be cooled before it can be blow moulded; cooling must be as uniform as possible to ensure the container is of good quality, and must be fast to reduce the cycle time; this cooling need is felt in particular when moulding is done by compression.

Other documents illustrating a male element for a mold are the following documents: JP2011230293A1 and EP3666493A1. JP2011230293A1 describes a circuit for cooling a male element of a mold which has the sole purpose of cooling the neck of the preform and not the entire preform. Instead, the document EP3666493A1 relates to injection molding.

DISCLOSURE OF THE INVENTION

The aim of this disclosure is to provide a male element of a mould, a mould, a forming and blow moulding machine and a method for the compression moulding and blow moulding of a parison to overcome the above mentioned disadvantages of the prior art.

This aim is fully achieved by the male element, the mould, the machine and the method of this disclosure as characterized in the appended claims.

This disclosure relates to a male element of a mould.

The mould is configured to form a parison. Preferably, the mould is configured for compression moulding the parison from a previously prepared charge of thermoplastic material; nevertheless, this disclosure might also be applicable to a male element of an injection mould or of an injection-compression mould.

The male element is associable with a female element of the mould to delimit a forming cavity in which the parison is formed. For example, the male element may define an upper half mould and the female element may define a lower half mould (or vice versa), movable towards and away from each other between an open position, in which they receive the charge of thermoplastic material, and a closed position, in which they delimit the forming cavity to mould the charge of material to form the parison. Preferably, the charge is received by the lower half mould. For example, the charge may be propelled onto the lower half mould by a charge propelling machine.

The male element comprises a die. The die extends along a longitudinal axis.

The male element (or rather, the die) comprises a ducting system located inside the die to allow a cooling fluid to flow in the male element. The cooling fluid may be water, for example.

The die comprises a body and a liner fitted round the body. The body has an outside surface facing towards the liner. The liner has an outside surface, acting in conjunction with the female element of the mould to delimit the forming cavity, and an inside surface which is in contact with the outside surface of the body. Preferably, the ducting system is formed between the body and the liner.

In one example, the ducting system is (or comprises one or more ducts which are) delimited by respective portions of the body and of the liner in mutual contact. In an example, either one (or both) of the inside surface of the liner and the outside surface of the body is (are) grooved, to form the ducting system (that is, to form the one or more ducts of the ducting system).

The body extends along the longitudinal direction to a body tip, which is operatively oriented towards the female element of the mould. The body has a first portion, with a first diameter, and a second portion, with a second diameter smaller than the first diameter, wherein the second portion is proximal to the body tip (the first portion being distal from the body tip). The outside surface of the body, in contact with the corresponding inside surface of the liner, is provided both in the first portion and in the second portion of the body.

The ducting system comprises one or more channels (or ducts) which interrupt the contact surface between the inside surface of the liner and the outside surface of the body; this contact surface is preferably provided also in the second portion of the body.

We observe that the ducting system is configured for generating or providing a circulation of fluid in the duct or ducts (i.e. in the channels), whereby a flow of refrigerating liquid flows through the ducts according to a predetermined flow path.

Preferably, the outside surface of the body is grooved, so as to create a surface with multiple hollows acting in conjunction with a corresponding portion of an inside surface of the liner to delimit the ducting system. The outside surface of the body also has non-hollowed contact or support zones where it is in contact with the liner. Thanks to the structure defined by the grooved body and the liner fitted round and supported by the body, it is possible for the liner to be made relatively thin, hence having low thermal resistance, thereby obtaining good cooling efficiency.

Preferably, the ducting system comprises a plurality of grooves. The grooves may be connected to each other in series or in parallel or partly in series and partly in parallel.

It should be noted that the outside surface of the body preferably includes a plurality of support zones where it is in contact with the inside surface of the liner; the support zones of the plurality of support zones are alternated with the grooves of the plurality of grooves. In other words, each groove is interposed between a first and a second support zone of the plurality.

Preferably, an entire portion of the outside surface of the body, not forming part of the hollowed surface, is in contact with the liner. Thus, the entire outside surface that does not define the hollows defines a support zone between the liner and the body.

In one or more embodiments, the ducting system defines at least one helix wound around the longitudinal axis.

In an embodiment, the ducting system comprises a delivery duct for circulating the cooling fluid towards one end of the die and a return duct for circulating the cooling fluid returning from the end of the die. In another embodiment, the ducting system comprises one between the delivery duct and the return duct, while the other between the delivery duct and the return duct is formed inside the body of the die.

Preferably, at least one between the delivery duct and the return duct defines a plurality of passages around the longitudinal axis. For example, at least one between the delivery duct and the return duct might have the shape of a coil, so that each curve defines a passage.

Preferably, at least one between the delivery duct and the return duct has the shape of a helix, or spiral, wound around the longitudinal axis; thus, each coil of the helix defines a passage. More specifically, the delivery duct has the shape of a first helix wound around the longitudinal axis and the return duct has the shape of a second helix wound around the longitudinal axis; preferably, at least one coil of the first helix is interposed, along the longitudinal axis, between a first and a second coil of the second helix. Similarly, at least one coil of the second helix is interposed, along the longitudinal axis, between a first and a second coil of the first helix.

The ducting system might also comprise, or define, a plurality of delivery ducts and/or a plurality of return ducts. For example, there might be one delivery duct formed in a longitudinal cavity of the body of the die, extending along the longitudinal axis, and one or more return ducts might be defined in the ducting system between the body and the liner of the die. More specifically, the one or more return ducts may be defined by a helical groove, or by a plurality of grooves extending in parallel with the longitudinal axis and connected to each other in parallel.

Preferably, the male element comprises a delivery manifold connected to the delivery duct and a return manifold connected to the return duct; the delivery manifold and the return manifold extend in parallel with the longitudinal axis. Preferably, the male element comprises a single delivery manifold and a single return manifold. Preferably, the delivery manifold and the return manifold are located inside the body: that is, they are defined by channels inside the body. Thus, in an embodiment, there is a first zone of the male element, distal from the end of the die, where the cooling fluid flows inside the body, in the delivery manifold and in the return manifold in parallel with the longitudinal axis, and a second zone of the male element, proximal to the end of the die, where the cooling fluid flows in the ducting between the liner and the body, following a plurality of passages (that is, turns or coils).

In an embodiment, the male element comprises a support structure (or upper part), where the die is retractile—that is, mobile—relative to the support structure so it can move between a retracted position where, together with the support structure, it contributes to delimiting the forming cavity, and an extracted position, where it is configured for stretching the parison. At the retracted position, the die is close to the support structure whereas, at the extracted position, it is spaced from the support structure.

More specifically, the die is connected to the end of a rod (itself forming part of the male element) which is slidably inserted in the support structure. Thus, in this embodiment, it is the die itself which, after forming the parison, moves in order to stretch it.

In another embodiment, the die has a longitudinal cavity inside it, which extends along the longitudinal axis and which, at one end of it, has a socket in communication with the longitudinal cavity; the male element also comprises a stretching rod which is slidably inserted in the longitudinal cavity and which, at one end of it, includes a terminal portion. The stretching rod is movable relative to the die between a retracted position, in which the terminal portion is housed inside the socket to contribute, together with the die, to delimiting the forming cavity, and an extracted position, in which the terminal portion is extracted from the socket so it stretches the parison. In this embodiment, therefore, the die, after forming the parison, remains stationary (relative to the upper part or support structure) and the stretching rod is extracted from the die in order to stretch the parison.

This disclosure also provides a mould; the mould is configured for forming and blow moulding a parison. Preferably, the mould is configured for compression moulding the parison from a charge of thermoplastic material. The mould might, however, be configured for injection moulding or injection-compression moulding the parison.

The mould comprises a male element according to one or more aspects of this disclosure. The mould comprises a female element which is associable with the male element to delimit the forming cavity that forms the parison. The mould also comprises a blow moulding cavity, associable with the male element instead of the female element to delimit a blow moulding cavity intended for the forming of a container from the parison. The mould has (that is, is operable in) a forming configuration in which the male element is associated with the female element. In the forming configuration, the blow moulding cavity is spaced from the male element.

In the embodiment in which there is a forming rod which is movable relative to the die, the stretching rod, in the forming configuration, is at the retracted position. In the embodiment in which the die is movable relative to the upper part of the male element, the die, in the forming configuration, is close to the upper part.

The mould has (that is, is operable in) a stretching and blow moulding configuration in which the male element is associated with the blow moulding cavity. In the stretching and blow moulding configuration, the female element is spaced from the male element. In the embodiment in which there is a forming rod which is movable relative to the die, the stretching rod, in the stretching and blow moulding configuration, is at the extracted position. In the embodiment in which the die is movable relative to the upper part of the male element, the die, in the stretching and blow moulding configuration, is extracted—that is, spaced from—the upper part.

The mould also has a charge receiving configuration, in which the female element is spaced from the male element to receive the charge. Preferably, the mould receives the charge from a charge inserting device which inserts the mould into the cavity of the female element; preferably, the charge inserting device propels the charge into the cavity of the female element.

Preferably, the die of the male element is positioned at the same vertical height in the forming configuration as it is in the stretching and blow moulding configuration; the stretching rod, on the other hand, is extracted for stretching and then moved down. Thus, the parison does not perform any downward movement after being formed and before being stretched (in effect, the parison remains attached to the die).

This disclosure also provides a forming and blow moulding machine comprising a plurality of moulds according to one or more aspects of this disclosure. The machine preferably comprises a rotary carousel, where the plurality of moulds are positioned, preferably equispaced, at the circular periphery of the rotary carousel.

This disclosure also provides a method for the forming and blow moulding of a parison. Preferably, the parison is formed by compression moulding; thus, the method preferably comprises a step of receiving a previously prepared charge of thermoplastic material in a mould and a step of forming the parison from the charge. In other embodiments, the parison might be formed by injection moulding or injection-compression moulding.

The parison is formed in a forming cavity delimited by a male element and a female element of the mould. The male element comprises a die, which extends along a longitudinal axis, and a ducting system, located inside the die to allow a cooling fluid to flow in the male element. The die comprises a body and a liner fitted round the body. The liner has an outside surface, acting in conjunction with the female element of the mould to delimit the forming cavity, and an inside surface which is in contact with the outside surface of the body. The ducting system is formed between the body and the liner. In other words, the ducting system is delimited by the outside surface of the body and the inside surface of the liner. The method comprises a step of cooling the die by passing a cooling fluid through the ducting system.

In an embodiment, the cooling fluid flows in a delivery duct towards one end of the die and in a return duct to flow back from the end of the die; preferably, at least one between the delivery duct and the return duct defines a plurality of passages around the longitudinal axis. More specifically, the delivery duct has the shape of a first helix wound around the longitudinal axis and/or the return duct has the shape of a second helix wound around the longitudinal axis.

BRIEF DESCRIPTION OF DRAWINGS

These and other features will become more apparent from the following description of a preferred embodiment, illustrated by way of non-limiting example in the accompanying drawings, in which.

6

Figure 5B:
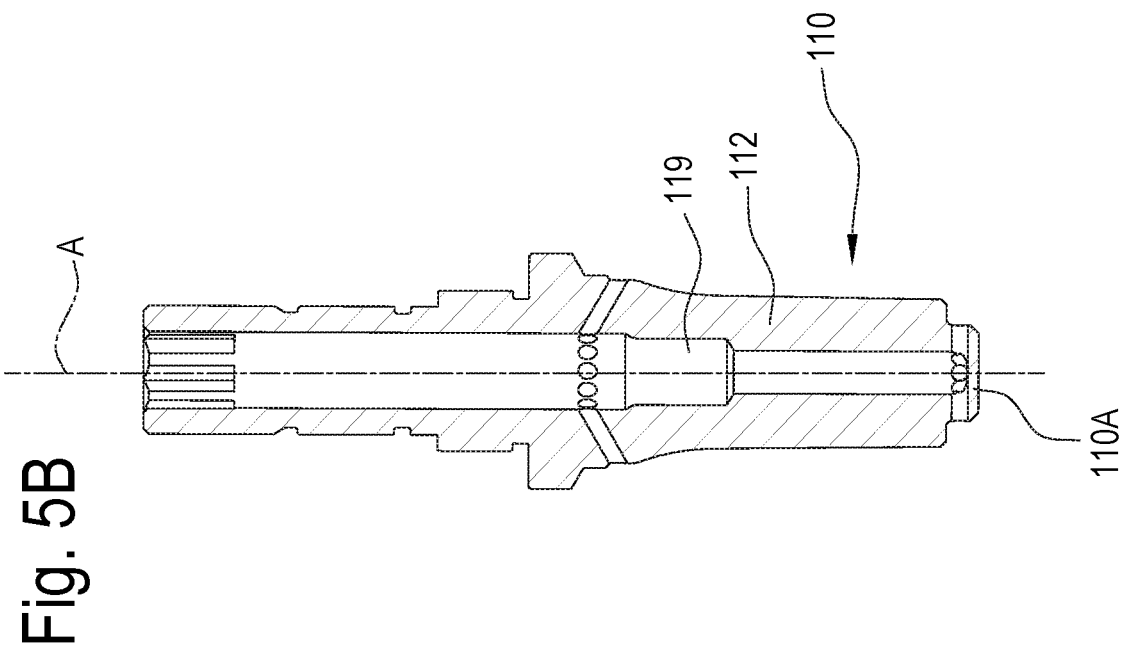
FIG. 5A illustrates a further embodiment of the body of the male element of the mould of FIG. 3A.
Figure 5A:
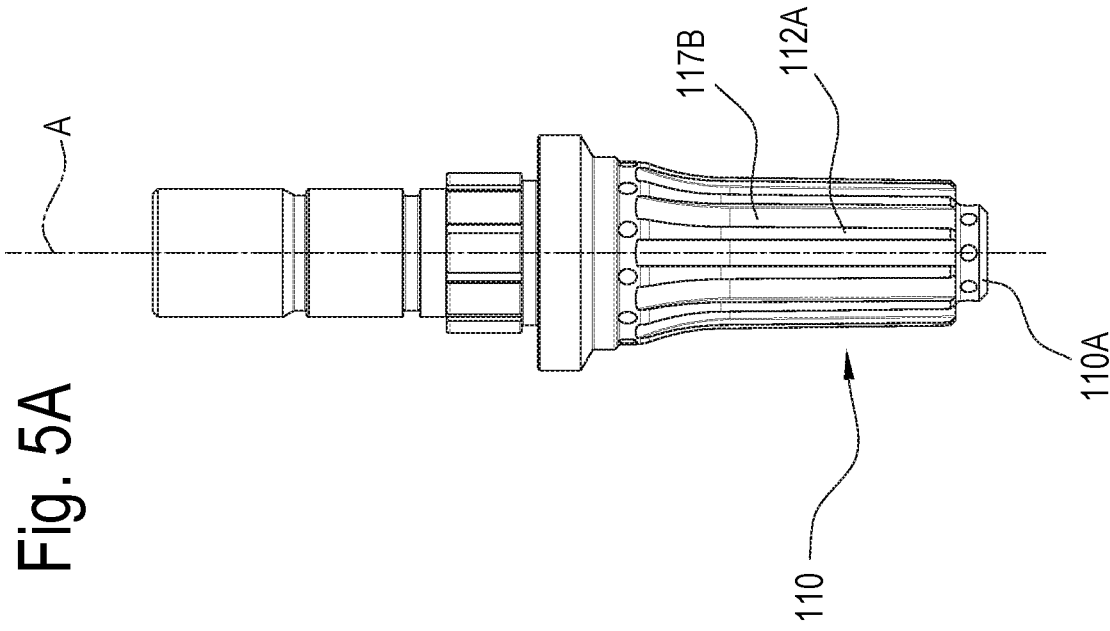

FIG. 5B illustrates the body of FIG. 5A in a longitudinal cross section.

DETAILED DESCRIPTION OF PREFERRED EMBODIMENTS OF THE INVENTION

With reference to the accompanying drawings, the numeral 10 denotes a mould.

The mould 10 comprises a male element 100 and a female element 200, movable between an open configuration, in which they are spaced apart, for receiving a charge, and a closed configuration, in which they are close together to delimit a forming cavity 20 for forming a parison from the charge.

The mould 10 also comprises a blow moulding cavity, not illustrated, associable with the male element 100 instead of the female element 200 to form a container from the parison.

The male element 100 comprises a die 110. The die 110 extends along a longitudinal axis to an end 110A. The die 110 juts from a remaining part of the male element 100 along the longitudinal axis A; thus, the die 110 forms a protrusion of the male element 100, configured to be inserted into the female element 200. The die 110 comprises a body 112. The die 110 also comprises a cooling circuit 114, configured to make the cooling fluid flow in the die 110. The die 110 comprises a liner 116 fitted round the body 112. A ducting system 117 forming part of the cooling circuit 114 is formed between the liner 116 and the body 112. More specifically, the body 112 is inwardly curved in such a way as to have one or more hollowed surfaces, which, together with a corresponding portion of the liner 116, delimit the ducting system 117. The body 112 also has non-grooved zones defining support surfaces 112A on which the liner 116 is supported. In other words, the liner 116 is in contact with the body 112 at the support surfaces 112A.

The cooling circuit 114 comprises a delivery duct 117A, 119 to guide the fluid to the proximity of the end 110A of the die 110, and a return duct 117B to guide the fluid returning from the end 110A of the die 110.

Preferably, at least one between the delivery duct 117A, 119 and the return duct 1178 has the shape of a helix wound around the longitudinal axis A.

In an embodiment, the delivery duct 117A has the shape of a first helix wound around the longitudinal axis A and the return duct 117B has the shape of a second helix wound around the longitudinal axis A. The first helix and the second helix are wound round each other, so at least one coil of the first helix is interposed between two consecutive coils of the second helix and at least one coil of the second helix is interposed between two consecutive coils of the first helix. The helically shaped delivery duct 117A and return duct 117B are located in a zone of the die 110 whose cross section is converging towards the end 110A. In an embodiment, the cooling circuit 114 also comprises a delivery manifold 117A', connected to the delivery duct 117A for bringing together the flow of cooling fluid, and a return manifold 117B', connected to the return duct 117B to extract the cooling fluid therefrom. The delivery manifold 117A' and the return manifold 117B' run parallel to the longitudinal axis A'. Thus, the cooling fluid flows down the delivery manifold 117A' and along the delivery duct 117A to the proximity of the end 110A of the die 110, then along the return duct 117B and up the return manifold 117B'.

In this embodiment, therefore, the ducting system 117 between the body 112 and the liner 116 defines the delivery duct 117A and the return duct 117B for the cooling fluid. Preferably, a support surface 112A is defined between each coil of the delivery duct 117A and the adjacent coil of the return duct 117B.

In an embodiment, the central delivery duct 119 is formed in a cavity inside the die, extending along the longitudinal axis A, and the return duct 117B is defined by the ducting system 117 between the body 112 and the liner 116. Thus, in this embodiment, the cooling fluid flows down inside the body 112 through the central delivery duct 119 and flows back up through the return duct 117B between the body 112 and the liner 116.

In an embodiment, the return duct 117B formed between the body 112 and the liner 116 may be spiral—that is, helical—in shape. Thus, the ducting system 117 defines a plurality of coils around the longitudinal axis A. In this case, therefore, the ducting system 117 includes a plurality of passages which are connected to each other in series. A non-hollowed support surface 112A, where the body 112 is in contact with the liner 116, is defined between each coil and the next.

In an embodiment, the return duct 117B formed between the body 112 and the liner 116 may be defined by a plurality of grooves extending along the longitudinal axis A. These grooves are connected to each other in parallel. In this case, therefore, the ducting system 117 includes a plurality of passages which are connected to each other in parallel.

Other variants of shape for the delivery and return ducts, not illustrated, are also imaginable. In an example embodiment, both the delivery duct and the return duct may include a plurality of grooves extending along the longitudinal axis and connected to each other in parallel. In another example embodiment, the delivery duct is defined by a helical ducting system between body and liner, whilst the return duct is formed in a cavity inside the body of the die. In another example embodiment, one between the delivery duct and the return duct is formed in an internal cavity inside the body of the die and the other between the delivery duct and the return duct is defined by a coil formed between body and liner; the coil might be made up of a plurality of grooves extending along the longitudinal axis and connected to each other in series.

Figure 1B:
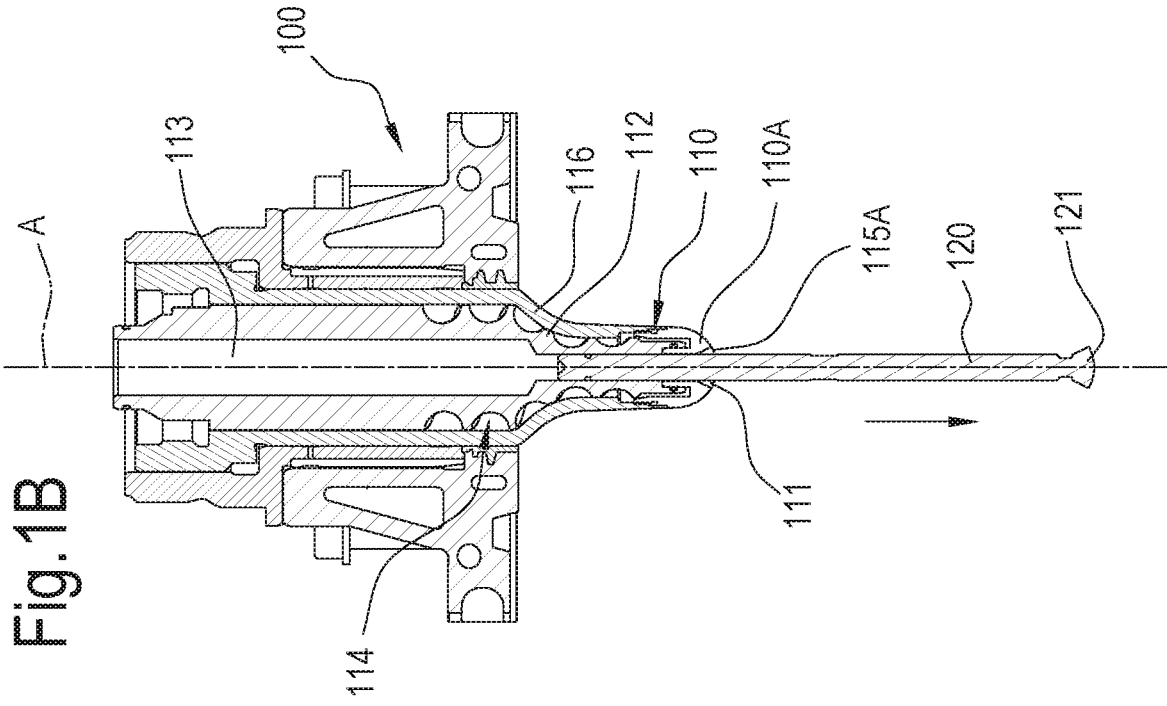
FIG. 1B illustrates the male element of the mould of FIG. 1A with a stretching rod at the extracted position.
Figure 1A:
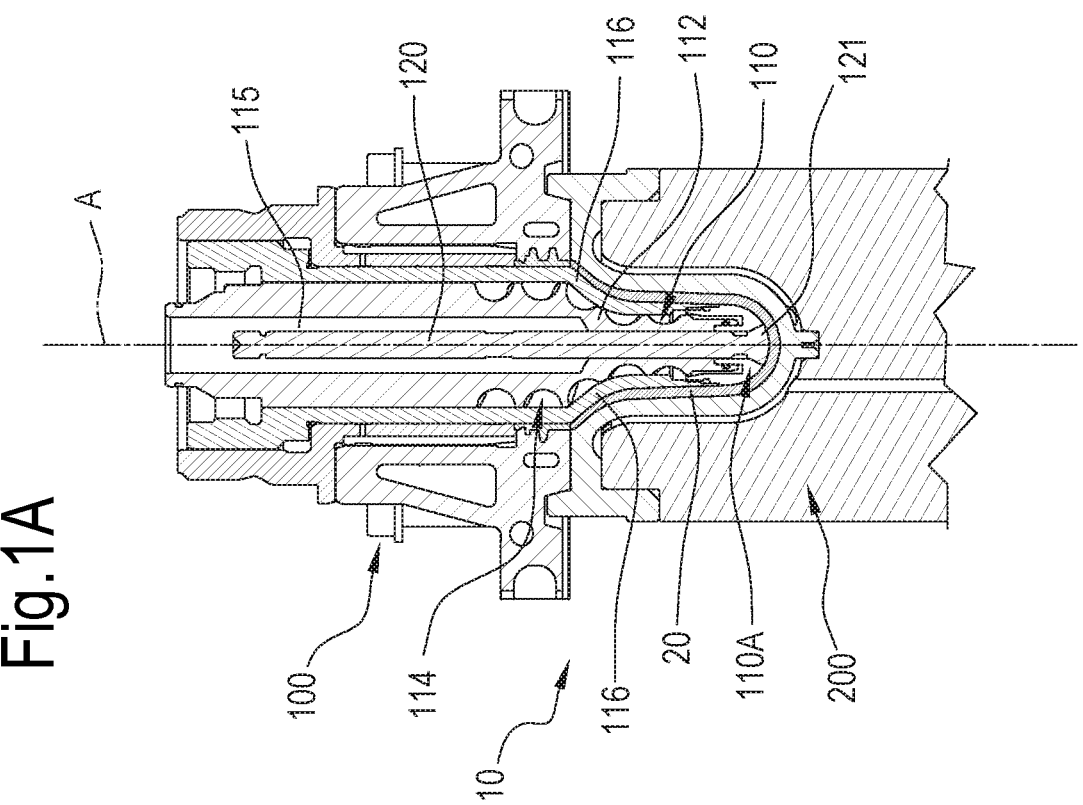
FIG. 1A illustrates a mould according to one or more aspects of this disclosure, in a forming configuration.
Figure 2:
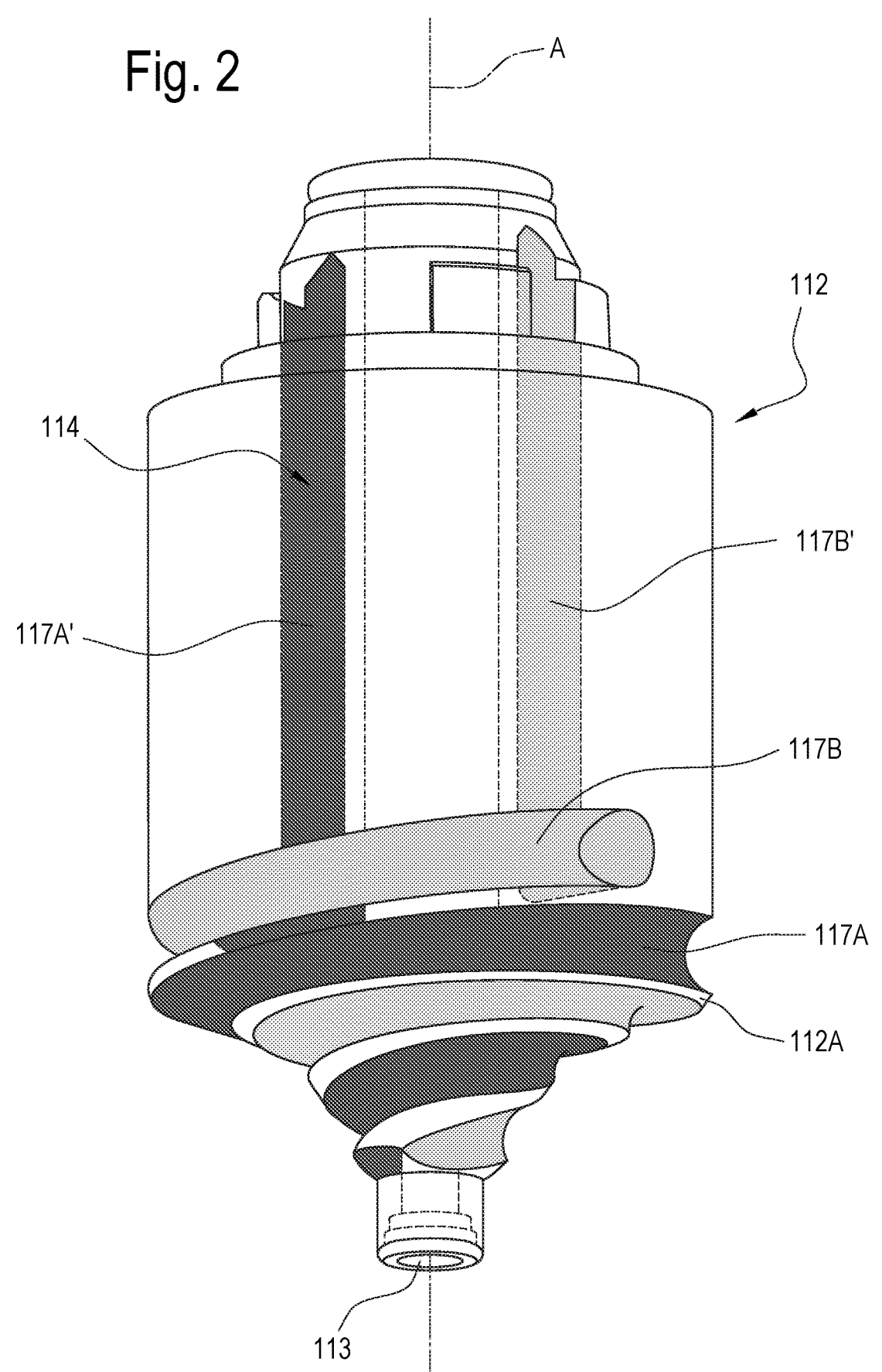
FIG. 2 illustrates the body of the male element of the mould of FIG. 1A.
Figures 3A, 3B:
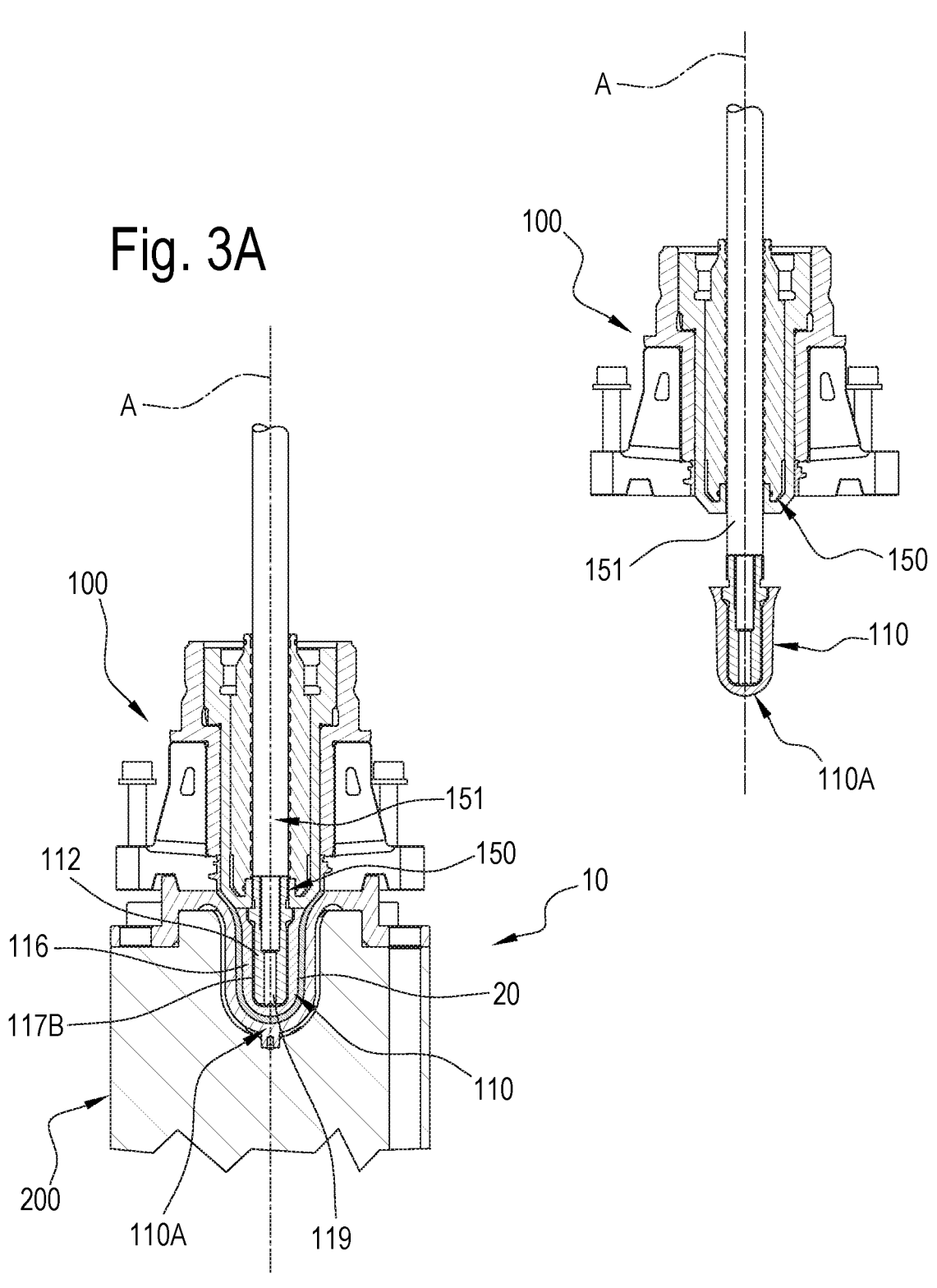
FIG. 3A illustrates a further embodiment of the mould according to this disclosure, in the forming configuration.
FIG. 3B illustrates the male element of the mould of FIG. 3A with a die at the extracted position.
Figure 4B:
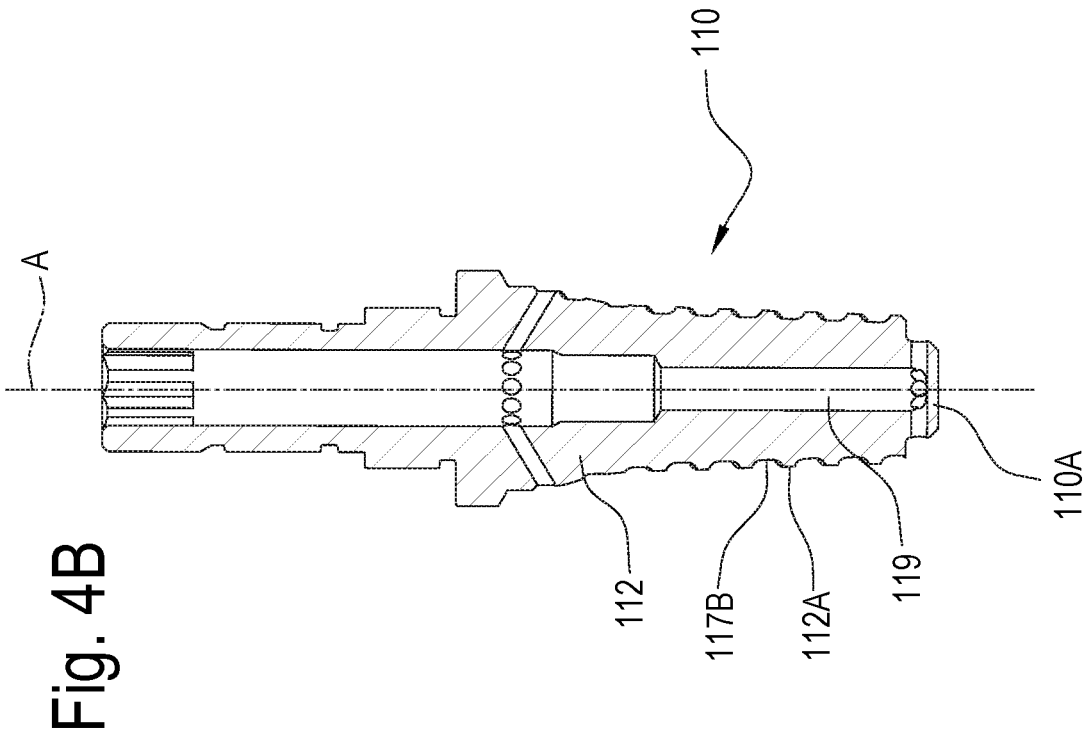
FIG. 4B illustrates the body of FIG. 4A in a longitudinal cross section.
Figure 4A:
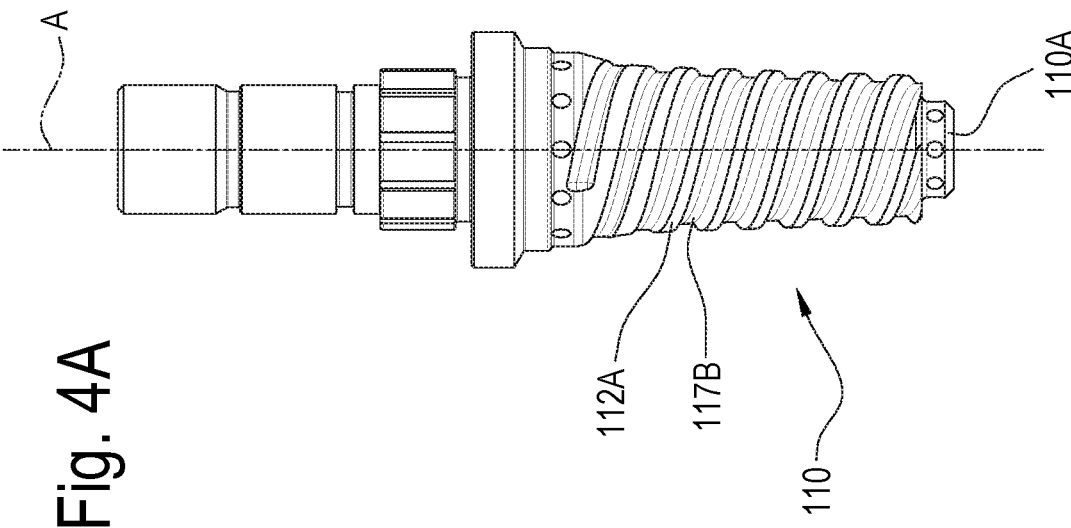
FIG. 4A illustrates the body of the male element of the mould of FIG. 3A.

In an embodiment, the die 110 has a socket 111, or recess, at its longitudinal end 110A. In this embodiment, the die 110, inside it, has a longitudinal cavity 113, extending along the longitudinal axis A. The longitudinal cavity 113 is formed in the body 112 of the die 110. The longitudinal cavity 113 communicates with—that is, opens onto—the socket 111. In this embodiment, the male element 100 also comprises a stretching rod 120 which is slidably inserted in the longitudinal cavity 113. The stretching rod 120 has an elongate body extending along the longitudinal axis A and a terminal portion 121 connected to one end of the elongate body. The terminal portion 121 is wider than the elongate body. Preferably, the longitudinal cross section of the terminal portion 121 becomes progressively wider away from the elongate body. The stretching rod 120 is movable between a retracted configuration, in which the elongate body is inserted in the longitudinal cavity 113 and the terminal portion 121 is inserted in the socket 111, and an extracted position, in which the elongate body is partly extracted from the longitudinal cavity 113 and the terminal portion 121 is extracted from the socket 111. It should be noted that the terminal portion 121 is larger in cross section than the longitudinal cavity 113 so it cannot enter the longitudinal cavity 113. Preferably, the terminal portion 121 has a flared shape. This embodiment is illustrated by way of an example in FIGS. 1A and 1B.

In this embodiment, the die 110 acts in conjunction with the female element 200 and with the terminal portion 121 of the stretching rod to form a bottom and a side wall of the parison, while the support structure 150 acts in conjunction with the female element 200 to form the neck of the parison.

It should be noted that in this embodiment, the stretching rod 120 is spaced from the wall of the body 112 defining the longitudinal cavity 113. Thus, there is a gap 115 between the stretching rod and the wall of the body 112 defining the longitudinal cavity 113. The gap 115 has a tubular shape around the stretching rod 120. In the embodiment illustrated, the gap 115 is wider in a zone far from the end 110A of the die 110 and narrower in a zone close to the end 110A of the die 110. The gap 115 is configured to channel the air flow used for blow moulding the parison. In effect, once it has been formed, the parison is blow moulded to make a container. The gap 115 runs along the longitudinal axis A as far as the socket 111, where it has an outlet 115A through which the blow moulding air is emitted. When the stretching rod 120 is at the retracted position, the terminal portion 121 occludes the outlet 115A; when the stretching rod 120 is at the extracted position, the outlet 115A is open to allow the blow moulding air to flow out of the gap 115.

In this embodiment, preferably, both the delivery duct 117A and the return duct 117B of the cooling circuit 114 are defined by the ducting system 117 between the body 112 and the liner 116. In effect, it would not be easy to form the ducts inside the body 112 of the die 110 since it contains the cavity 113 for the stretching rod 120.

In an embodiment, the die 110 is movable relative to a support structure (or upper part) 150 of the male element 100. In this embodiment, the support structure 150 has a cavity that extends along the longitudinal axis A; the male element 100 also comprises a rod 151 which is slidably inserted in the longitudinal cavity of the support structure 150. The rod 151 has one end fixed to the die 110. Thus, the die 110 is movable relative to the support structure 150 between a retracted position, where it is in contact with the support structure 150 in order to form the parison, and an extracted position, where it is spaced from the support structure 150 in order to stretch the parison. In this embodiment, the forming cavity 20 is delimited by the female element 200, the die 110 and the support structure 150. More specifically, in this embodiment, the die 110 acts in conjunction with the female element 200 to form a bottom and a side wall of the parison, while the support structure 150 acts in conjunction with the female element 200 to form the neck of the parison.

This embodiment might comprise a blow moulding air duct, not illustrated, inside the rod 151 and the body 112 of the die 110. Alternatively, the blow moulding air may be channeled by a gap between the rod 151 and the support structure 150.

In this embodiment, preferably, the cooling circuit 114 includes the central delivery duct 119 inside the die 110 and the return duct 117B between the body 112 and the liner 116. Alternatively, the delivery duct might be defined between the body and the liner might be inside the die.

The invention claimed is:

1. A male element of a mould for compression moulding of a parison from a previously prepared charge of thermoplastic material, wherein the male element is associable with a female element of the mould to delimit a forming cavity intended for forming the parison, comprising:
   a die, extending along a longitudinal axis, the die including a body having an outside surface and a liner fitted round the body, the liner having an outside surface, acting in conjunction with the female element of the mould to delimit the forming cavity, and an inside surface in contact with the outside surface of the body; and a ducting system located inside the die to allow a cooling fluid to flow in the male element, the ducting system including a delivery duct for circulating the cooling fluid towards one end of the die and a return duct for circulating the cooling fluid returning from the end of the die, wherein the delivery duct is shaped as a first helix wound around the longitudinal axis and the return duct is shaped as a second helix wound around the longitudinal axis, wherein at least one coil of the first helix is interposed, along the longitudinal axis, between a first and a second coil of the second helix, the ducting system being formed between the body and the liner.

2. The male element according to claim 1, wherein the outside surface of the body is grooved, so as to create a hollowed surface acting in conjunction with a corresponding portion of the inside surface of the liner to delimit the ducting system.

3. The male element according to claim 2, wherein the ducting system comprises a plurality of grooves.

4. The male element according to claim 3, wherein the outside surface of the body includes a plurality of support zones where it is in contact with the inside surface of the liner, wherein the support zones of the plurality of support zones are alternated with the grooves of the plurality of grooves.

5. The male element according to claim 2, wherein an entire portion of the outside surface of the body, external with respect to the hollowed surface, is in contact with the liner.

6. The male element according to claim 1, wherein the ducting system defines a helix wound around the longitudinal axis.

7. The male element according to claim 1, wherein at least one of the delivery duct and the return duct defines a plurality of passages around the longitudinal axis.

8. The male element according to claim 7, further comprising a delivery manifold, connected to the delivery duct, and a return manifold, connected to the return duct, wherein the delivery manifold and the return manifold extend in parallel with the longitudinal axis.

9. The male element according to claim 1, further comprising a support structure, wherein the die is retractile relative to the support structure so it can move between a retracted position where, together with the support structure, it contributes to delimiting the forming cavity, and an extracted position where it is configured for stretching the parison.

10. The male element according to claim 1, wherein the die, inside it, has a longitudinal cavity, extending along the longitudinal axis and, at one end of it, a socket in communication with the longitudinal cavity, and wherein the male element also comprises a stretching rod, slidably inserted in the longitudinal cavity and including a terminal portion at one end of it, the stretching rod being movable relative to the die between a retracted position, in which the terminal portion is housed inside the socket to contribute, together with the die, to delimiting the forming cavity, and an extracted position, in which the terminal portion is extracted from the socket so it stretches the parison.

11. The male element according to claim 1, wherein the ducting system comprises a duct delimited by portions of the outside surface of the body and of the inside surface of the liner.

12. The male element according to claim 1, wherein the ducting system is delimited by respective portions of the body and of the liner in mutual contact.

13. The male element according to claim 12, wherein either one or both of the inside surface of the liner and the outside surface of the body is grooved, to form the ducting system.

14. The male element according to claim 1, wherein the body extends along the longitudinal direction to a body tip, the body tip being operatively oriented towards the female element of the mould, and wherein the body has a first portion, with a first diameter, and a second portion, with a second diameter smaller than the first diameter, wherein the second portion is proximal to the body tip and the first portion is distal from the body tip, and wherein the outside surface of the body, in contact with the corresponding inside surface of the liner, is provided both in the first portion and in the second portion of the body.

15. The male element according to claim 1, wherein the ducting system comprises one or more channels which interrupt a contact surface between the inside surface of the liner and the outside surface of the body, this contact surface being provided also in a second portion of the body, and wherein the ducting system is configured for generating a circulation of fluid in the channels, whereby a flow of refrigerating liquid flows through the channels according to a predetermined flow path.

16. The male element according to claim 1, wherein the die, inside it, has a longitudinal cavity, extending along the longitudinal axis and, at one end of it, a socket in communication with the longitudinal cavity, wherein the ducting system extends between a first end and a second end along the longitudinal axis of the male element, the two ends being axially spaced from each other, wherein the liner has a first diameter at the first end and a second, smaller diameter at the second end, the second end being positioned in proximity to the socket.

17. A mould for the compression moulding of a parison from a charge of thermoplastic material, wherein the mould comprises:

a male element according to claim 1;

a female element, associable with the male element to delimit the forming cavity that forms the parison from the charge; and a blow moulding cavity, associable with the male element instead of the female element to delimit a blow moulding cavity intended for the forming of a container from the parison, wherein the mould has a forming configuration in which the male element is associated with the female element and the stretching rod is at the retracted position, to form the parison in the forming cavity, and a stretching and blow moulding configuration in which the male element is associated with the blow moulding cavity and the stretching rod is at the extracted position.

18. A method for compression moulding of a parison, the method comprising:

receiving a previously prepared charge of thermoplastic material in a mould;

forming the parison from the charge in a forming cavity delimited by a male element and a female element of the mould, wherein the male element comprises a die, extending along a longitudinal axis, the die including a body having an outside surface and a liner fitted round the body, the liner having an outside surface, acting in conjunction with the female element of the mould to delimit the forming cavity, and an inside surface in contact with the outside surface of the body, and a ducting system, located inside the die to allow a cooling fluid to flow in the male element, the ducting system including a delivery duct for circulating the cooling fluid towards one end of the die and a return duct for circulating the cooling fluid returning from the end of the die, wherein the delivery duct is shaped as a first helix wound around the longitudinal axis and the return duct is shaped as a second helix wound around the longitudinal axis, wherein at least one coil of the first helix is interposed, along the longitudinal axis, between a first and a second coil of the second helix, the ducting system being formed between the body and the liner; and cooling the die by passing a cooling fluid through the ducting system.

19. The method according to claim 18, further comprising causing the cooling fluid to flows in the delivery duct towards one end of the die and in a return duct returning from the longitudinal end of the die, wherein at least one between the delivery duct and the return duct defines a plurality of passages around the longitudinal axis.

20. A male element of a mould for compression moulding of a parison from a previously prepared charge of thermoplastic material, wherein the male element is associable with a female element of the mould to delimit a forming cavity intended for forming the parison, comprising:

a die, extending along a longitudinal axis, the die including a body having an outside surface and a liner fitted round the body and having an outside surface, acting in conjunction with the female element of the mould to delimit the forming cavity, and an inside surface in contact with the outside surface of the body; and a ducting system located inside the die to allow a cooling fluid to flow in the male element, the ducting system including a plurality of delivery ducts and a plurality of return ducts wherein one delivery duct is formed in a longitudinal cavity of the body of the die, extending along the longitudinal axis, and one or more return ducts are defined in the ducting system between the body and the liner of the die, wherein the one or more return ducts are defined by a plurality of grooves extending in parallel with the longitudinal axis and connected to each other in parallel, the ducting system being formed between the body and the liner.

\* \* \* \* \*